(12) United States Patent
Kahlman

(10) Patent No.: US 11,997,773 B2
(45) Date of Patent: May 28, 2024

(54) LIGHT EMITTING DIODE, LED, BASED CURRENT SPLITTER FOR SPLITTING AN LED CURRENT BETWEEN A PLURALITY OF LED CHANNELS AS WELL AS A MULTI-CHANNEL LIGHT EMITTING DIODE, LED, BASED LIGHTING DEVICE

(71) Applicant: SIGNIFY HOLDING B.V., Eindhoven (NL)

(72) Inventor: Henricus Marius Joseph Maria Kahlman, Dongen (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 266 days.

(21) Appl. No.: 17/637,750

(22) PCT Filed: Sep. 1, 2020

(86) PCT No.: PCT/EP2020/074258
§ 371 (c)(1),
(2) Date: Feb. 23, 2022

(87) PCT Pub. No.: WO2021/043730
PCT Pub. Date: Mar. 11, 2021

(65) Prior Publication Data
US 2022/0287164 A1 Sep. 8, 2022

(30) Foreign Application Priority Data
Sep. 3, 2019 (EP) .................................... 19195129

(51) Int. Cl.
*H05B 45/46* (2020.01)
*H05B 45/20* (2020.01)

(52) U.S. Cl.
CPC ............ *H05B 45/46* (2020.01); *H05B 45/20* (2020.01)

(58) Field of Classification Search
None
See application file for complete search history.

(56) References Cited

U.S. PATENT DOCUMENTS

2006/0232219 A1 10/2006 Xu
2009/0009102 A1* 1/2009 Kahlman ............... H05B 45/42
315/250

(Continued)

FOREIGN PATENT DOCUMENTS

CN 104540271 A 4/2015

*Primary Examiner* — Crystal L Hammond

(57) ABSTRACT

A Light Emitting Diode, LED, based current splitter for splitting an LED current between a plurality of LED channels, wherein said current splitter comprises at least two in series connected LED circuits, wherein each LED circuit comprises a first branch (B1.1, B2.1) comprising at least one LED, a second branch (B1.2, B2.2) connected in parallel over said first branch (B1.1, B2.1) and comprising at least one LED and a branch switch (W1, W3) connected in series with said at least one LED, wherein a forward voltage of said at least one LED in said second branch (B1.2, B2.2) is lower than a forward voltage of said at least one LED in said first branch (B1.1, B2.1) and a third branch (B1.3, B2.3) connected in parallel over said first and second branch (B1.2, B2.2) and comprising a shunt switch (W2, W4) for shunting said first branch (B1.1, B2.1) and said second branch (B1.2, B2.2).

10 Claims, 4 Drawing Sheets

(56) References Cited

U.S. PATENT DOCUMENTS

| | | | |
|---|---|---|---|
| 2013/0154507 A1* | 6/2013 | Gilliom | H05B 45/3725 |
| | | | 315/297 |
| 2013/0300292 A1 | 11/2013 | Wray | |
| 2015/0257223 A1* | 9/2015 | Siessegger | H05B 45/44 |
| | | | 315/186 |
| 2016/0278171 A1* | 9/2016 | Jermyn | H05B 45/10 |
| 2017/0171936 A1 | 6/2017 | Seki | |
| 2017/0238376 A1* | 8/2017 | Kahlman | H05B 45/48 |
| | | | 315/121 |
| 2019/0320515 A1* | 10/2019 | Sadwick | H05B 45/00 |

* cited by examiner

| W1 | W2 | W3 | W4 | Active | V_out [V] |
|----|----|----|----|--------|-----------|
| 0  | 0  | X  | 1  | WW     | 36        |
| X  | 1  | 0  | 0  | CW     | 36        |
| 1  | 0  | X  | 1  | Cyan   | 18        |
| X  | 1  | 1  | 0  | Blue   | 18        |
| 0  | 0  | 1  | 0  | WW+Blue | 54       |
| 1  | 0  | 0  | 0  | CW+Cyan | 54       |
| 0  | 1  | 0  | 1  | All off | 0        |

Fig. 4

LIGHT EMITTING DIODE, LED, BASED CURRENT SPLITTER FOR SPLITTING AN LED CURRENT BETWEEN A PLURALITY OF LED CHANNELS AS WELL AS A MULTI-CHANNEL LIGHT EMITTING DIODE, LED, BASED LIGHTING DEVICE

CROSS-REFERENCE TO PRIOR APPLICATIONS

This application is the U.S. National Phase application under 35 U.S.C. § 371 of International Application No. PCT/EP2020/074258, filed on Sep. 1, 2020, which claims the benefit of European Patent Application No. 19195129.2, filed on Sep. 3, 2019. These applications are hereby incorporated by reference herein.

FIELD OF THE INVENTION

The present disclosure relates to a Light Emitting Diode, LED, based current splitter for splitting an LED current between a plurality of LED channels, wherein said current splitter comprises parallel and in series connected branches, wherein at least some of those branches comprises at least one LED.

BACKGROUND OF THE INVENTION

Lighting devices have been developed that make use of Light Emitting Diodes, LEDs, for a variety of lighting applications. Owing to their long lifetime and high energy efficiency, LED lamps are nowadays also designed for replacing traditional fluorescent lamps, i.e. for retrofit applications. For such an application, a retrofit LED lamp is typically adapted to fit into the socket of the respective lamp fixture to be retrofitted. Moreover, since the maintenance of a lamp is typically conducted by a user, the retrofit LED lamp should ideally be readily operational with any type of suitable fixture without the need for re-wiring the fixture.

The present disclosure is related to multi-channel LED based lighting devices. Each channel may comprise one or a plurality of LED's that are capable of emitting light at a particular color. For example a first channel may be directed to emit red colored light. A second channel may be directed to emit green colored light and a third channel may be directed to emit blue colored light.

In such lighting devices, a fixed voltage source may be used to power the LED's in each of the channels. The current through each of the channels may be set in the factory by tuning a resistor which is placed in series with the LED's of a particular channel. One of the downsides of such an approach is related to several disturbing factors such as voltage variations of the power source, cable lengths, i.e. impedances, interactions between channels which may cause errors for the targeted flux and color point.

Another option is that the lighting device is provided with a current source, wherein the lighting device comprises a current splitter for splitting the current over the different channels.

More specifically, typically, there is a controller available having a plurality of channels, wherein each channel is arranged with a switch, wherein each of the switches is thus arranged to enable a particular corresponding channel. For example, a first switch may enable a red channel, a second switch may enable a green channel, a third switch may enable a blue channel, etc.

The switches may be provided width Pulse Width Modulation, PWM, signals having particular duty cycles. The frequency of the PWM signals should be chosen such that it exceeds the refresh rates of the human eye. This would prevent a user from seeing any flickering. By controlling the duty cycle, the contribution of each of the channels to the total amount of light emitted can be controlled, and thus also the color of the light that is emitted by the LED based lighting device.

One of the downsides of the architecture provided above is that the control resolution of the PWM signals decreases by adding more channels.

SUMMARY

It is an object of the present disclosure to provide for a current splitter that reduces the effect of the decrease in the control resolution of the PWM signals. Further objects of the present disclosure include a multi-channel Light Emitting Diode, LED, based lighting device, wherein said multi-channel LED based lighting device comprises an LED based current splitter in accordance with the present disclosure.

In a first aspect, there is provided a Light Emitting Diode, LED, based current splitter for splitting an LED current between a plurality of LED channels, wherein said current splitter comprises at least two in series connected LED circuits.

Each LED circuit comprises:
a first branch (B1.1, B2.1) comprising at least one LED;
a second branch (B1.2, B2.2) connected in parallel over said first branch (B1.1, B2.1) and comprising at least one LED and a branch switch (W1, W3) connected in series with said at least one LED, wherein a forward voltage of said at least one LED in said second branch (B1.2, B2.2) is lower than a forward voltage of said at least one LED in said first branch (B1.1, B2.1);
a third branch (B1.3, B2.3) connected in parallel over said first and second branch (B1.2, B2.2) and comprising a shunt switch (W2, W4) for shunting said first branch (B1.1, B2.1) and said second branch (B1.2, B2.2).

One of the advantages the current splitter in accordance with the present disclosure has over the current splitter in accordance with the prior may be best understood using an example.

In the prior art, four switches are used for enabling four channels. Each switch enables one particular channel. Each channel may be directed to a particular color light. Combination of channels may be used by providing PWM signals as control signals for controlling each of the switches. In such a way, different colors may be realized. In other words, it is possible to create four primary colors and a multitude of other colors by mixing those four primary colors.

The current splitter in accordance with the present disclosure may also utilize four switches. In such a case, the current splitter may comprise two LED circuits connected in series, wherein each LED circuit comprises three branches connected in parallel. A first branch comprises at least one LED, a second branch comprises at least one LED and a branch switch and a third branch comprises a shunt switch.

One of the three branches in the first LED circuit may be "enabled" at a time, and one of the three branches in the second LED circuit may be "enabled" at a time, resulting in a total of nine different layouts. One of the nine different layouts comprises the situation in which both shunt switches of the LED circuits are activated, thereby effectively creating a short circuit. As such, eight remaining useful layouts remain which can be considered as eight channels. Thus, the current splitter in accordance with the present disclosure may provide eight channels using four switches, compared to the prior art situation in which only four channels are obtained using four switches. In other words, it is possible to create eight primary colors and a multitude of other colors by mixing those eight primary colors.

The above reduces the unwanted effect that the control resolution of the PWM decreases by adding more channels.

It is noted that, in accordance with the present disclosure, a forward voltage of said at least one LED in said second branch (B1.2, B2.2) is lower than a forward voltage of said at least one LED in said first branch (B1.1, B2.1). The inventors have found that it may not be necessary to include a branch switch in the first branch as long as the forward voltage of the at least one LED in the second branch is lower than a forward voltage of the at least one LED in the first branch.

If there is no switch in the first branch present, it is not possible to actively, functionally, disconnect the first branch such that the current does not flow through the first branch. The inventors have found that the current may still be directed to the second branch by ensuring that the forward voltage of the at least one LED in the second branch is lower than the forward voltage of the at least one LED in the first branch. As such, by activating the branch switch in the second branch, the first branch is effectively deactivated.

It is further noted that the current splitter in accordance with the present disclosure operates effectively when it is connected to a current source, or when it comprises a current source. A current source may be viewed as an electronic circuit that is able to provide for an electric current which is independent of the voltage across it.

In accordance with the present disclosure any of the LED's present in the current splitter may be directed to cool white colored LED's, warm white colored LED's, cyan colored LED's, blue colored LED's or anything alike.

In an example, at least one of said LED circuits further comprises:
- a further branch (B1.4) connected in parallel over said first, second and third branch, and comprising at least one LED and a further branch switch (W5) connected in series with said at least one LED, wherein a forward voltage of said at least one LED in said further branch (B1.4) is lower than a forward voltage of said at least one LED in said first branch (B1.1, B2.1).

The above example describes the situation in which an additional branch is connected in parallel over the other branches in the LED circuit. The additional branch may be provided with a branch switch for enabling or disabling that particular branch. It is noted that, in accordance with the present disclosure, a plurality of additional branches may be utilized.

It is noted that, preferably, the current splitter has exactly two in series connected LED circuits. The inventors have known that such a particular layout may be beneficial for many lighting devices that are currently on the market.

In a further example, the LED circuits in accordance with the present disclosure may be homogenous LED circuits or heterogeneous LED circuit.

In the context of the present disclosure, homogenous circuits are circuits that have the same topology; For example all the LED circuits have three branches. Heterogeneous circuits are circuits that have different topology; For example a first LED circuit has three branches and a further LED circuit has four branches or the like.

In a further example, the LED based current splitter further comprises:
- a controller for controlling any of said switches in said LED circuits.

Here, the controller may be arranged for activating one switch at a time at most for each of said LED circuits.

In another example, the controller is further arranged for dimming said at least one LED's by activating any of said shunt switches.

The shunt switches may be used to provide for a dimming function. The current splitter in accordance with the present disclosure is especially suitable to be used in combination with a current source having a fixed amount of current. By using the shunt switches, the current may be shunted over a particular branch, thereby reducing the amount of light emitted by that particular branch. A PWM signal is especially suitable for this purpose.

The controller may interface with a memory for controlling each of the switches such that a particular color is emitted. In accordance with the present disclosure, the memory may be a Read Only Memory, ROM, Random Access Memory, RAM, a cache or anything alike.

In accordance with the present disclosure, the controller may, for example, be a microcontroller or any other control device such as a microprocessor, a field programmable gate array, FPGA, or anything alike. The microcontroller may, for example, receive the relevant input signals at some of the available input pins and may be provide output control signals at other available output pins.

In a further example, the branches are arranged to provide different colored lighting by using different type of LED's in each of said branches.

In a second aspect, there is provided a multi-channel Light Emitting Diode, LED, based lighting device, wherein said multi-channel LED based lighting device comprises an LED based current splitter in accordance with any of the previous examples, wherein a channel consists of one of said branches in a first of said at least two in series connected LED circuits, and one of said branches in subsequent of said least two in series connected LED circuits.

These and other aspects of the invention will be apparent from and elucidated with reference to the embodiment(s) described hereinafter.

BRIEF DESCRIPTION OF THE DRAWINGS

FIG. 4 shows a table indicating the channels that are enabled based on the switches that are activated.

DETAILED DESCRIPTION

Figure 1:
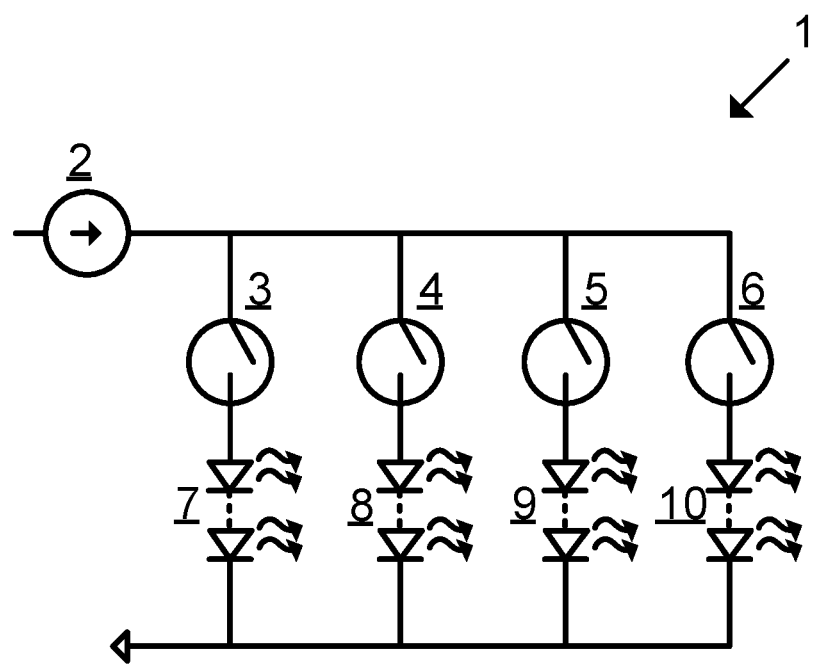
FIG. 1 discloses a current splitter for splitting an LED current in accordance with the prior art.

FIG. 1 discloses a current splitter 1 for splitting an LED current in accordance with the prior art.

The LED current splitter 1 may be comprised in a multi-channel Light Emitting Diode, LED, based lighting device. Multi-channel indicates that the LED based lighting device has a plurality of channels, wherein each channel is directed to LED's emitting a particular color. For example, a first channel may be directed to emit red colored light, a second channel may be directed to emit green colored light and a third channel may be directed to emit blue colored light.

The LED current splitter 1 of FIG. 1 has four channels, wherein each channel comprises a switch 3, 4, 5, 6, and a respective at least one LED 7, 8, 9, 10. Each of the switches 3, 4, 5, 6 may be controlled with Pulse Width Modulation, PWM, signals by a controller. The above allows the controller to emit four primary colors, for example red, green, blue and white, and to emit a plurality of secondary colors by mixing the channels with one another.

A current source 2 is indicated for providing the LED current to the LED current splitter 1. It is noted that the current source 2 may be implemented in a variety of ways. For example, the current source 2 may be implemented as an LED driver.

Figure 2:
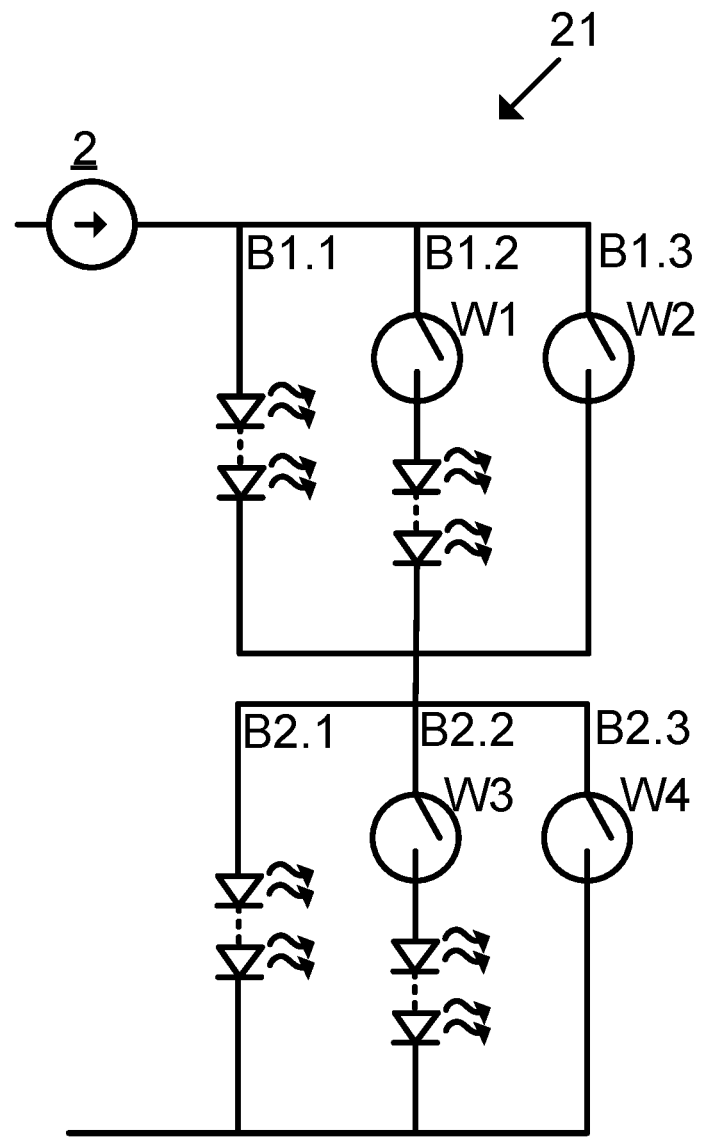
FIG. 2 discloses a current splitter for splitting an LED current in accordance with the present disclosure.

FIG. 2 discloses a current splitter 21 for splitting an LED current in accordance with the present disclosure. The current splitter 21 comprises two in series connected LED circuits as indicated with reference numerals 22 and 23.

The first LED circuit 22 comprises a first branch B1.1, a second branch B1.2 and a third branch B1.3.

In this example, the first branch B1.1 comprises at least one LED. The branch B1.1 may comprise a single LED, for example a power LED, or a plurality of LED's. The LED's may all be of the same type, or may be of different type. The LED's may emit the same color of light, or may emit different colors of light. It is noted that the first branch B1.1 does not comprises a branch switch.

The second branch B1.2 is connected in parallel over the first branch B1.1 and comprises at least one LED and a branch switch W1. The branch switch W1 is used for activating or deactivating the second branch B1.2. The inventors have noted that the at least one LED in the second branch B1.2 may be placed in parallel over the at least one LED in the first branch B1.1 as long as the forward voltage of the at least one LED in the second branch B1.2 is lower than a forward voltage of the at least one LED in the first branch B1.1. This ensures that, when the branch switch W1 is activated, the current flows through the second branch B1.2 and not through the first branch B1.1.

Typically, the forward voltage of an LED is between 1.8 and 3.3 volts. It may, however, vary by the color of the LED. A red LED typically drops about 1.8 volts, but since both voltage drop and light frequency increase with band gap, a blue LED may drop from 3 to 3.3 volts.

The third branch B1.3 is connected in parallel over the first branch B1.1 and the second branch B1.2, wherein the third branch B1.3 comprises a shunt switch W2 for shunting the first branch B1.1 and the second branch B1.2. The shunt switch W2 basically short circuits the first branch B1.1 and the second branch B1.2.

The topology as described above for the first LED circuit 22 is repeated for the second LED circuit 23.

The first branch of the second LED circuit 23 is indicated with reference B2.1, the second branch of the second LED circuit 23 is indicated with reference B2.2 and the third branch of the second LED circuit 23 is indicated with reference B2.3. The branch switch in the second branch B2.2 of the second LED circuit 23 is indicated with reference W3 and the shunt switch in the third branch B2.3 of the second LED circuit 23 is indicated with W4.

Figure 3:
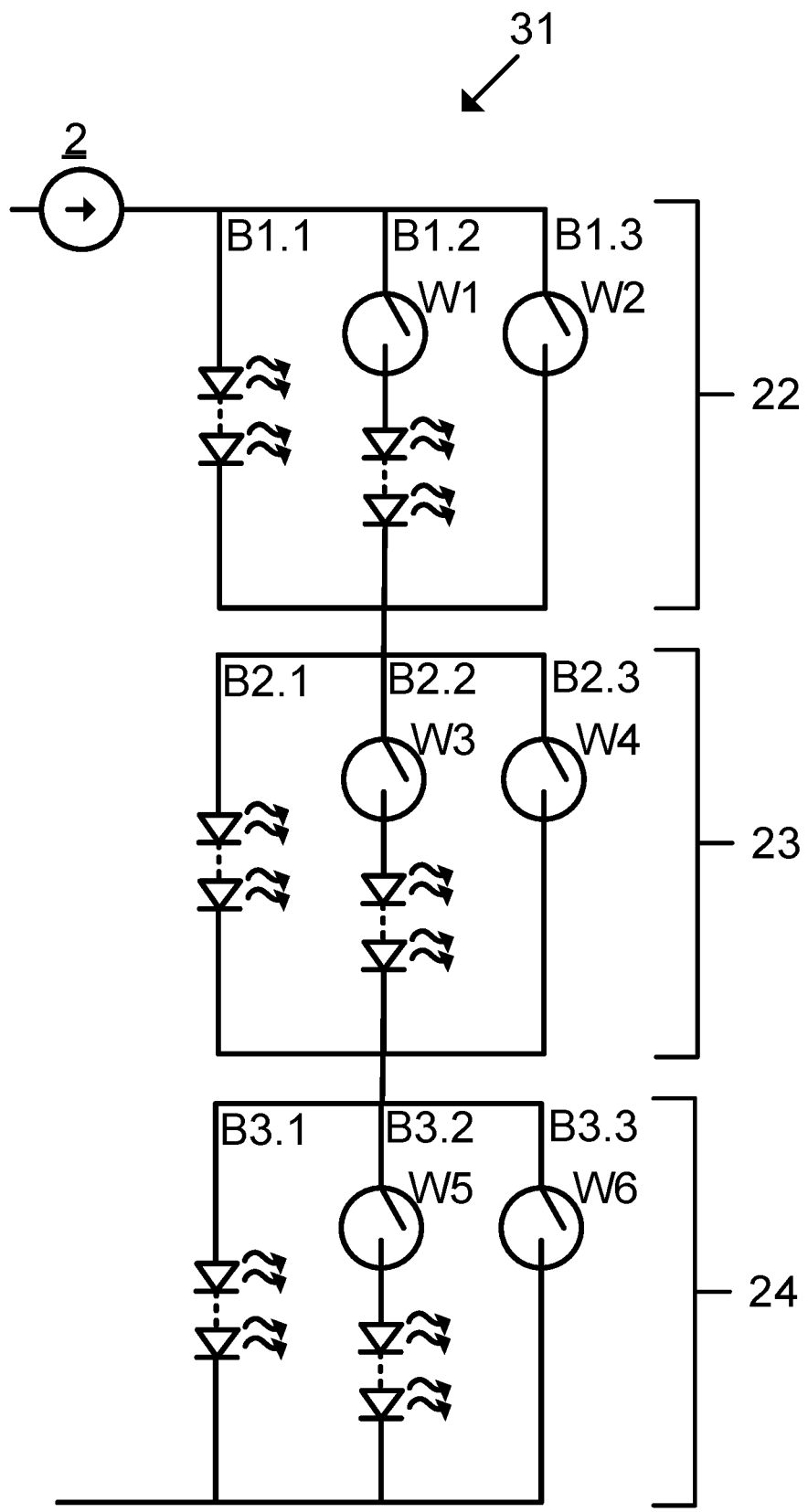
FIG. 3 discloses a current splitter for splitting an LED current in accordance with another example of the present disclosure.

FIG. 3 discloses a current splitter 31 for splitting an LED current in accordance with another example of the present disclosure.

Here, the same reference numerals are used for the same, or similar, aspects as compared to the reference numerals of FIG. 2. It is noted that three LED circuits are placed in series, being the ones as indicated with reference numerals 22, 23 and 24. The third LED circuit 24 also comprises three branches as indicated with reference numerals B.31, B3.2 and B3.3.

The current splitter 31 may be connected to a current source 2 having a fixed amount of current as an output. In order to establish a dimming effect, each of the shunt switches W2, W4 and W6 may be periodically activated to shunt the LED's in any of the branches.

FIG. 4 shows a table indicating the channels that are enabled based on the switches that are activated.

The first four columns of the table refer to the switches W1, W2, W3 and W4 of the current splitter as shown in FIG. 2. The fifth column indicates the particular color, i.e. channel, that is selected based on which of the four switches are activated. Here, "WW" indicates warm white light, "CW" indicates cool white light, "Cyan" indicates cyan light and "Blue" indicates blue light.

The table shows that, for example, a warm white color is selected if the branch switch W1 is deactivated, the shunt switch W2 is deactivated and the shunt switch W4 is activated. This means that the current will only flow through the at least one LED of the first branch of the first LED circuit 22.

It is noted that none of the LED's will emit light in case both shunt switches W2 and W4 are activated, as, in such a case, the current will simply return to the current source.

Other variations to the disclosed embodiments can be understood and effected by those skilled in the art in practicing the claimed invention, from a study of the drawings, the disclosure, and the appended claims, In the claims, the word "Comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope thereof.

The invention claimed is:

1. A Light Emitting Diode (LED) based current splitter for splitting an LED current between a plurality of LED channels, wherein said current splitter comprises at least two in series connected LED circuits, wherein each LED circuit comprises:
   a first branch comprising at least one LED;
   a second branch connected in parallel over said first branch and comprising at least one LED and a branch switch connected in series with said at least one LED, wherein a forward voltage of said at least one LED in said second branch is lower than a forward voltage of said at least one LED in said first branch; and
   a third branch connected in parallel over said first and second branch and comprising a shunt switch for shunting said first branch and said second branch.

2. The LED based current splitter in accordance with claim 1, wherein at least one of said LED circuits further comprises:
   a further branch connected in parallel over said first, second and third branch, and comprising at least one LED and a further branch switch connected in series with said at least one LED, wherein a forward voltage of said at least one LED in said further branch is lower than a forward voltage of said at least one LED in said first branch.

3. The LED based current splitter in accordance with claim 1, wherein said current splitter has two in series connected LED circuits.

4. The LED based current splitter in accordance with claim 1, wherein said LED circuits are homogenous LED circuits.

5. The LED based current splitter in accordance with claim 1, wherein said LED circuits are heterogeneous LED circuits.

6. The LED based current splitter in accordance with claim 1, wherein said LED based current splitter further comprises:
a controller for controlling any of said switches in said LED circuits.

7. The LED based current splitter in accordance with claim 6, wherein said controller is arranged for activating one switch at a time at most for each of said LED circuits.

8. The LED based current splitter in accordance with claim 6, wherein said controller is further arranged for dimming said at least one LED's by activating any of said shunt switches.

9. The LED based current splitter in accordance with claim 1, wherein said branches are arranged to provide different colored lighting by using different type of LED's in each of said branches.

10. A multi-channel Light Emitting Diode, LED, based lighting device, wherein said multi-channel LED based lighting device comprises an LED based current splitter in accordance with claim 1, wherein a channel consists of one of said branches in a first of said at least two in series connected LED circuits, and one of said branches in subsequent of said least two in series connected LED circuits.

* * * * *